United States Patent Office 2,886,401
Patented May 12, 1959

2,886,401
TANNING WITH PERIODATE OXYPOLYSACCHARIDES

Percy A. Wells, Abington, Edward M. Filachione, Philadelphia, and Martin L. Fein, Elkins Park, Pa., assignors to the United States of America as represented by the Secretary of Agriculture No Drawing. Application November 15, 1957
Serial No. 696,884

8 Claims. (Cl. 8—94.33)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This application is a continuation-in-part of the copending application "Tanning With Periodate Oxypolysaccharides," Serial No. 553,673, filed December 16, 1955, now abandoned.

This invention relates to the tannage of hides, skins and leather by use of periodate-oxidized polysaccharides, and particularly to tannage with the periodate-oxidized polysaccharides such as oxystarch, oxycellulose and oxydextrin.

By hides, skins and leather we mean to include all animal hides, skins and furs that are commercially tanned, and in particular, cowhide, horsehide, calfskin, pigskin, sheepskin and goatskin, as well as leathers made by the conventional tannage of such hides.

Polysaccharides, as the word is used here, means polymeric materials, the repeating unit of which is the anhydroglucose unit. The number of such units in a polymer is unknown but large, so that the term does not include such low molecular weight materials as di- or trisaccharides or other so-called oligosaccharides. Typical polysaccharides include cellulose, starch, dextrins, dextrans and related materials.

Pediodate oxypolysaccharides and periodate-oxidized polysaccharides are terms applied to the oxidation products of certain processes whereby in the aforementioned polysaccharides a carbon-to-carbon bond is cleaved and two aldehyde groups are formed from an anhydroglucose unit as illustrated by the following structures:

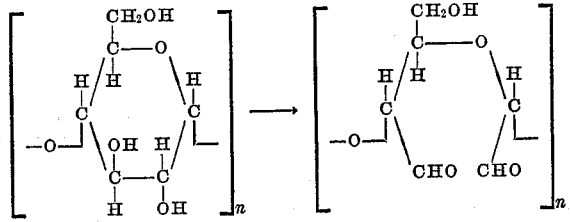

New and efficient processes for the production of these materials are described in U.S. Patents 2,648,629 and 2,713,553. Although the active oxidizing agent in most processes is periodic acid, periodate salts may also be used as the oxidizing agent. Regardless of whether periodic acid or a periodate salt is employed, the products of this specific type of oxidation of polysaccharides are usually referred to as periodate oxypolysaccharides when considered collectively, and for purposes of this application the particular products will be referred to as simply oxystarch, oxydextrin or oxycellulose.

The extent of oxidation, as described, of a polysaccharide such as starch can be readily controlled, and a complete range of aldehyde derivatives of starch is made available as the oxidation level varies between zero and 100 percent. At 100 percent oxidation each anhydroglucose unit is converted to the dialdehyde structure; at 50 percent oxidation half of the anhydroglucose units are so altered. "Fully oxidized" commercial products usually analyze 95 to 100 percent dialdehyde units. Oxystarch, also known as dialdehyde starch, is thus an open chain polymer containing aldehyde groups, and, if no other bond rupture occurs, should have the same molecular weight as the starch from which it was made. Oxydextrin and oxycellulose are the periodate (periodic acid) oxidation products of dextrin and cellulose, respectively, and a similar analogy applies to the molecular weights of the oxidized products in regard to that of the polysaccharide from which they were prepared. When the polysaccharide has been oxidized to a level less than fully oxidized it is generally considered that the anhydroglucose units were attacked in a substantially random fashion so that the product is a polymeric material made up of more or less random sequence of anhydroglucose and dialdehyde units whose structures are those shown above.

We have discovered that periodate oxypolysaccharides may be employed as tanning agents to provide smooth-grained, light-colored tanned hides which had good leather characteristics.

In general, according to the invention a periodate oxypolysaccharide, that is, a polysaccharide such as starch, dextrin or cellulose in which about 10 to 100%, preferably at least about 30%, of the anhydroglucose units have been converted by means of periodic acid or periodate oxidation to dialdehyde units characterized by the formula

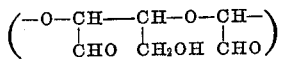

is solubilized either by gently warming a suspension of the periodate oxypolysaccharide in dilute aqueous alkali until the oxypolysaccharide is solubilized, or by autoclaving an aqueous suspension of the oxypolysaccharide for about 30 minutes at about 120° C. to obtain a solubilized oxypolysaccharide, and an aqueous solution containing the solubilized periodate oxypolysaccharide and having a pH in the range of about 4.5 to 10, is applied to the hide until the hide is tanned. In an alternative process the periodate oxypolysaccharide is added as a solid directly to an alkaline solution preferably in the pH range of about 7 to 10 containing the hide to be tanned, and solubilization in the aqueous alkaline solution and tanning of the hide proceed concomitantly.

Because of its abundant supply, low cost and high reactivity, starch is our preferred raw material for the preparation of our tanning agents. Oxystarch is preferably made according to the above cited patents whereby the expensive reagent, sodium periodate, is constantly regenerated electrolytically during the reaction, thus making oxystarch (dialdehyde starch) potentially available at low cost. As thus produced, however, oxystarch is not appreciably soluble in water at room temperature and must be solubilized prior to or during the tanning process in order to act as a tanning agent. Among the various methods for its solubilization, two are particularly convenient. The first consists of solution in hot water, preferably by autoclaving an aqueous suspension of oxystarch at about 120° C. for about 30 minutes. The second consists of dissolving the oxystarch in dilute aqueous alkali such as sodium hydroxide, sodium carbonate, sodium bicarbonate, magnesium oxide, and other salts or oxides which in water give a solution whose pH is at least 7, preferably in the range of 7 to 10. In the second method, solution of the oxystarch is expedited, if such is desired, by gently warming the aqueous medium. Either method yields a product entirely suitable for our purpose. The other periodate oxypolysaccharides can be similarly solubilized and used in the present invention.

Hides to be tanned with periodate oxypolysaccharides require no special preparation, the same preliminary treatments that are used before conventional vegetable, mineral or syntan tannage being entirely satisfactory.

In making leather for certain purposes it is sometimes advantageous to utilize a combination tannage wherein a conventional vegetable, mineral or syntan tannage is combined with periodate oxypolysaccharide tannage, in which case either tannage may be applied first or, if desired, the two tanning agents may be used concurrently.

The practice of the invention is illustrated by the following examples.

EXAMPLES 1 TO 20

The oxystarch (dialdehyde starch) tanning agents employed in these examples assayed 10, 29, 60, 71 and 95 to 98% dialdehyde content, respectively. Each oxystarch preparation was dissolved by autoclaving a 10% suspension in water at 120° C. for 30 minutes. The cooled solution was then adjusted to a concentration of 5% with respect to oxystarch and sufficient anhydrous sodium sulfate added to make the solution 10% with respect to this salt. At each level of dialdehyde content the solution was divided into four parts so that the pH of these solutions when used for tanning were maintained in the regions of approximately 5, 8, and 10 by the use of acetate, bicarbonate, magnesium oxide, and mixed bicarbonate-magnesium oxide buffers, respectively. Small pieces of drained pickled calfskin, 4 x 6 inches, or about 40 grams were added to 120 grams of the dialdehyde starch solution (3:1 float) in bottles which were gently agitated at room temperature by rolling on a jar mill. Small portions of these specimens were removed after 2, 6, 24, and 72 hours of treatment for determination of shrinkage temperature and leather-like drying after washing in running water for one day. These data are presented in Table I.

EXAMPLES 21 TO 29

One part of fully oxidized oxystarch (95 to 100% dialdehyde units per molecule) was suspended in about 1½ parts of 0.1 N (0.4%) aqueous sodium hydroxide. The suspension was gently warmed on a steam bath, with constant stirring, until, after a few minutes, the solid dissolved to form a fluid yellow solution. When diluted with water to 10% solids content this solution had a pH of about 7. Pickled calfskin was depickled, adjusted to the isoelectric point (pH 4.8), washed, and cut into 1 x 3 inch strips. Five strips (about 6 grams dry weight) were placed in a bottle with 50 ml. of a 5% aqueous solution of solubilized, fully oxidized oxystarch. Various salts and buffers were added to different bottles as shown in Table II and the bottles agitated at room temperature by rolling on a jar mill. Shrink temperatures (Ts) were determined at various time intervals to measure the extent of the tanning action. The tanned products were washed, air-dried, and examined for appearance, flexibility and leather-like properties. The leather obtained in these examples was very light colored and, with the exception of those tanned at pH values below about 4.5, was firm and full and flexible.

*Table I*
TANNING OF CALFSKIN WITH OXYSTARCH (AUTOCLAVED)[a]

| Example No. | Treatment | | | Shrinkage Temp., ° C., After— | | | | | LLD After[d]— Hrs. |
|---|---|---|---|---|---|---|---|---|---|
| | Dialdehyde Content,[b] Percent | Buffer | pH | 2 Hrs. | 6 Hrs. | 24 Hrs. | 72 Hrs. | Neutr.[c] | |
| 1 | 95 to 98 | HOAc-NaOAc | 4.9–5.0 | 61 | 72 | 76 | 78 | ---- | 24 |
| 2 | 95 to 98 | 0.3 N NaHCO₃ | 7.3–8.2 | 74 | 80 | 81 | 83 | 82 | 6 |
| 3 | 95 to 98 | 1% MgO | 9.6–9.5 | 55 | 61 | 79 | 83 | 79 | 24 |
| 4 | 95 to 98 | MgO+NaHCO₃ | 9.4–8.9 | 69 | 85 | 86 | 87 | 86 | 6 |
| 5 | 71 | HOAc-NaOAc | 4.9–5.0 | ---- | 66 | 70 | 74 | ---- | 24 |
| 6 | 71 | 0.3 N NaHCO₃ | 7.3–7.8 | 68 | 74 | 81 | 82 | 80 | 6 |
| 7 | 71 | 1% MgO | 10.1–10.2 | 53 | 63 | 73 | 74 | 70 | 72 |
| 8 | 71 | MgO+NaHCO₃ | 10.0–9.8 | 68 | 80 | 83 | 79 | 77 | 6 |
| 9 | 60 | HOAc-NaOAc | 5.0 | ---- | 66 | 68 | 72 | ---- | 24 |
| 10 | 60 | 0.3 N NaHCO₃ | 7.2–7.7 | 67 | 72 | 78 | 81 | 79 | 6 |
| 11 | 60 | 1% MgO | 10.2 | 55 | 62 | 69 | 74 | 72 | 72 |
| 12 | 60 | MgO+NaHCO₃ | 9.6–9.4 | 73 | 80 | 83 | 84 | 79 | 2 |
| 13 | 29 | HOAc-NaOAc | 5.0 | ---- | 61 | 62 | 64 | ---- | >72 |
| 14 | 29 | 0.3 N NaHCO₃ | 7.1–8.6 | 63 | 66 | 74 | 82 | 78 | 24 |
| 15 | 29 | 1% MgO | 10.6–10.4 | 56 | 61 | 68 | 68 | 63 | >72 |
| 16 | 29 | MgO+NaHCO₃ | 10.6–10.3 | 72 | 73 | 77 | 76 | 73 | 2 |
| 17 | 10 | HOAc-NaOAc | 5.0 | ---- | 60 | 60 | 62 | ---- | >72 |
| 18 | 10 | 0.3 N NaHCO₃ | 7.4–8.8 | 62 | 61 | 68 | 77 | 73 | 72 |
| 19 | 10 | 1% MgO | 10.6–10.2 | 53 | 53 | 64 | 63 | 62 | >72 |
| 20 | 10 | MgO+NaHCO₃ | 10.6–9.9 | 68 | 67 | 69 | 72 | 65 | >72 |

[a] Tanning solution: 5% solution concentration with respect to oxystarch (solubilized in autoclave), 10% in Na₂SO₄ (added after autoclaving).
[b] Extent of anhydroglucose units of starch converted to dialdehyde structure.
[c] Sample tanned for 3 days then neutralized in acetate buffer (pH ca. 5) for 2 hours, then washed.
[d] Time of tanning which produced specimen showing leather-like drying.

*Table II*
TANNING OF CALFSKIN WITH SOLUBILIZED PERIODATE OXYSTARCH

| Ex. No. | Buffer | Salt[a] | pH | Ts, in ° C., After—Hours | | | | | |
|---|---|---|---|---|---|---|---|---|---|
| | | | | 1 | 2 | 3 | 6 | 24 | 48 | 72 |
| 21 | 0.1 M Citrate | None | 4.0–4.1 | ---- | 61 | ---- | 63 | 70 | 71 | 71 |
| 22 | 0.1 M Citrate | NaCl | 4.2–4.3 | ---- | 56 | ---- | 59 | 65 | 67 | 68 |
| 23 | None | None | 4.7–4.2 | ---- | 67 | ---- | 69 | 75 | 76 | 76 |
| 24 | None | NaCl | 5.1–5.3 | 68 | ---- | 72 | 73 | 76 | 77 | 79 |
| 25 | 0.25 M NaHCO₃ | NaCl | 8.3–7.6 | 75 | ---- | 77 | 77 | 77 | 77 | 78 |
| 26 | 0.5 M NaHCO₃ | Na₂SO₄ | 8.1–8.0 | ---- | 72 | ---- | 75 | 79 | 80 | 81 |
| 27 | 0.25 M Na₂CO₃ | Na₂SO₄ | 9.4–8.6 | ---- | 70 | ---- | 70 | 74 | 74 | 77 |
| 28 | 1% Ca(OH)₂ | Na₂SO₄ | 8.3–7.2 | ---- | 64 | ---- | 64 | 68 | 69 | 71 |
| 29 | 1% MgO | Na₂SO₄ | 10.1–9.8 | ---- | 68 | ---- | 71 | 75 | 74 | 78 |

[a] Salt, when used, was at a concentration of 5%.

EXAMPLES 30 TO 44

For each example a 10% solution of sodium sulfate in water was prepared and sufficient sodium bicarbonate or magnesium oxide (or mixtures of these two alkaline agents) added to make the solutions 0.3 N in NaHCO$_3$ and/or 1% in MgO. To 120 grams of one of the buffered solutions was added 6 grams of oxystarch and a 4 x 6 inch piece of drained pickled calfskin. The order of introducing the pickled hide and the oxystarch is immaterial. In these examples oxystarch with levels of oxidation of 95 to 98, 71, 60, 29, and 10%, respectively, were employed with each of the three buffer solutions. Agitation was provided by carrying out the treatment at room temperature while the bottles were rolled on a jar mill. The oxystarch gradually dissolved during the earlier stages of the treatment. The results are presented in Table III.

Comparison of the data of these examples with that of the examples of Table I reveals that tanning with the solid oxystarch at pH 7 to 8 was slower than with oxystarch solubilized by autoclaving, probably because the solid material dissolved rather slowly at this pH. In drum tannage of hides this is advantageous since it provides an automatic means for the gradual increase of aldehyde concentration in the tanning solution and facilitates the production of a smooth-grained leather.

In general, comparable results were obtained with comparable systems regardless of the method of solubilizing the oxystarch. The tanning action of oxystarch of 10% dialdehyde content was very slow, and, under certain conditions resulted in poorly tanned leather. Examples 2, 6, 10 and 14 (Table I) illustrate the attaining of approximately the same shrinkage temperature (Ts about 80° C.) with oxystarches ranging from 98 down to 29% in dialdehyde content, although the rate of tanning decreased with decreasing dialdehyde content. In practical operation of this invention we prefer to use oxystarch of at least about 30% dialdehyde content.

Although presence of buffers and certain salts during tanning with periodate oxypolysaccharides influences the rate of tanning and the quality of the leather products, Examples 23 and 24 (Table II) illustrate that hides are tanned in the absence of both buffer and salt (pH about 4.5), or in the presence of sodium chloride only (pH about 5), respectively.

When split cowhide was substituted for calfskin in the above examples substantially the same tanning action was observed. Full thickness cowhide and similar heavy hides naturally required a somewhat longer time for complete penetration and tanning action but the final result was equally satisfactory. While in the examples cited we employed tanning solutions containing 5% by weight of oxystarch, other levels of concentration of oxystarch have been used with satisfactory results. For example, sheepskins were tanned with an aqueous solution containing about 2.5% oxystarch to give a leather of good quality.

When other solubilized periodate-oxidized polysaccharides such as oxycellulose and oxydextrin are used instead of the oxystarch of the above examples, substantially equivalent results are obtained.

The tanning agents of this invention have been described in terms of the present practical method, namely periodate oxidation, of making these particular oxidation products, that is, those in which anhydroglucose units are converted to dialdehyde units. Since it is the chemical properties of these oxidation products that are critical to the invention, the same type of oxidation products obtained by a different process would be equally applicable to the present invention.

An interesting feature of the data in Tables I and III is the comparison of the magnesium oxide system with a mixture of this oxide and sodium bicarbonate to control the pH. Even though the pH of these two systems was substantially the same, the latter system resulted in a much more rapid tanning action and was preferable to the former.

We claim:

1. A process of tanning a hide comprising applying an aqueous solution of a periodate oxypolysaccharide containing at least about 30% dialdehyde units of the formula

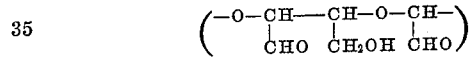

and selected from the group consisting of oxystarch, oxycellulose, and oxydextrin at a pH in the range of about from 4.5 to 10 to the hide until the hide is tanned.

2. The process of claim 1 wherein the periodate oxypolysaccharide is oxystarch.

3. A process of tanning a hide comprising solubilizing a periodate oxypolysaccharide containing at least about 30% dialdehyde units of the formula

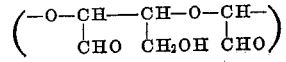

Table III
TANNING OF CALFSKIN WITH OXYSTARCH (DRY)[a]

| Example No. | Treatment | | | Shrinkage Temp., °C., After— | | | | | LLD After [d]— Hrs. |
|---|---|---|---|---|---|---|---|---|---|
| | Dialdehyde Content,[b] Percent | Buffer | pH | 2 Hrs. | 6 Hrs. | 24 Hrs. | 72 Hrs. | Neutr.[c] | |
| 30 | 98 | 0.3 N NaHCO$_3$ | 7.5–8.2 | 64 | 73 | 81 | 83 | 83 | 24 |
| 31 | 98 | MgO, 1% | 9.5–9.4 | 53 | 66 | 81 | 84 | 80 | 24 |
| 32 | 98 | MgO+NaHCO$_3$ | 9.5–8.8 | 80 | 83 | 86 | 87 | 85 | 2 |
| 33 | 71 | NaHCO$_3$ | 7.4–7.8 | 63 | 70 | 80 | 82 | 80 | 24 |
| 34 | 71 | MgO | 10.3–10.2 | 59 | 63 | 71 | 75 | 74 | 72 |
| 35 | 71 | MgO+NaHCO$_3$ | 10.8–8.8 | 74 | 77 | 82 | 83 | 79 | 2 |
| 36 | 60 | NaHCO$_3$ | 7.3–8.0 | 62 | 78 | 81 | 84 | 83 | 6 |
| 37 | 60 | MgO | 9.5–9.6 | 57 | 60 | 73 | 77 | 74 | 24 |
| 38 | 60 | MgO+NaHCO$_3$ | 9.3–9.0 | 76 | 78 | 87 | 85 | 86 | 2 |
| 39 | 29 | NaHCO$_3$ | 7.4–8.6 | 67 | 71 | 79 | 85 | 83 | 24 |
| 40 | 29 | MgO | 9.6–9.8 | 63 | 63 | 66 | 69 | 70 | >72 |
| 41 | 29 | MgO+NaHCO$_3$ | 9.4 | 74 | 82 | 86 | 83 | 79 | 6 |
| 42 | 10 | NaHCO$_3$ | 7.3–8.9 | 64 | 66 | 74 | 80 | 78 | 24 |
| 43 | 10 | MgO | 9.7–9.9 | 55 | 62 | 65 | 66 | 64 | >72 |
| 44 | 10 | MgO+NaHCO$_3$ | 10.3–9.8 | 66 | 72 | 70 | 70 | 67 | 6 |

[a] Tanning solution: 5% on solution basis with respect to oxystarch (added dry), 10% in Na$_2$SO$_4$.
[b] See footnote (b), Table I.
[c] See footnote (c), Table I.
[d] See footnote (d), Table I.

and selected from the group consisting of oxystarch, oxycellulose, and oxydextrin by gently warming a suspension of the periodate oxypolysaccharide in dilute aqueous alkali until the oxypolysaccharide is dissolved, and then applying an aqueous solution of the solubilized oxypolysaccharide at a pH in the range of about from 4.5 to 10 to the hide until the hide is tanned.

4. The process of claim 3 wherein the periodate oxypolysaccharide is oxystarch.

5. A process of tanning a hide comprising solubilizing a periodate oxypolysaccharide containing at least about 30% dialdehyde units of the formula

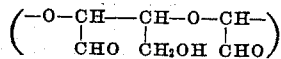

and selected from the group consisting of oxystarch, oxycellulose, and oxydextrin, by autoclaving an aqueous suspension of the periodate oxypolysaccharide for about 30 minutes at about 120° C., and then applying an aqueous solution of the solubilized oxypolysaccharide at a pH in the range of about from 4.5 to 10 to the hide until the hide is tanned.

6. The process of claim 5 wherein the periodate oxypolysaccharide is oxystarch.

7. A process of tanning a hide comprising adding the hide and a solid periodate oxypolysaccharide containing at least about 30% dialdehyde units of the formula

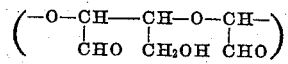

and selected from the group consisting of oxystarch, oxycellulose, and oxydextrin to an aqueous solution at a pH in the range of about from 7 to 10, and agitating the resulting mixture until the hide is tanned.

8. The process of claim 7 wherein the periodate oxypolysaccharide is oxystarch.

References Cited in the file of this patent
UNITED STATES PATENTS 1,539,517    Schmidt _____ May 26, 1925

OTHER REFERENCES

Kerr: "Chemistry and Industry of Starch," 2nd ed., Academic Press, N.Y.C., 1950, pp. 328–329.